3,208,850
VESICULAR TYPE PHOTOGRAPHIC MATERIALS COMPRISING A POLYURETHANE RESIN CONTAINING LIGHT DECOMPOSABLE COMPOUNDS
Alfred F. Daech, New Orleans, La., assignor to Kalvar Corporation, New Orleans, La., a corporation of Louisiana
No Drawing. Filed Apr. 11, 1962, Ser. No. 186,647
6 Claims. (Cl. 96—91)

The present invention relates to new photographic materials which are useful for producing vesicular or "scatter center" images by exposure to light and development by dry heat.

It is known in the photography art that vesicular or scatter center images may be created in certain types of photographic films by means of small bubbles of gas which are formed and trapped in the areas of the film exposed to light. Generally speaking, a film of this type comprises a colloid or resin coating or vehicle on an appropriate backing material with a light-sensitive agent or sensitizer, most commonly a diazo compound, dispersed throughout the coating. When such a film is exposed to light, the light sensitive agent or sensitizer decomposes and releases molecules of a gas which in the case of a diazo sensitzer, is nitrogen. Upon heating the thus exposed film, the released gas forms the desired vesicular image according to the exposure pattern. Presumably, this phenomenon occurs in the development because the vehicle is relaxed sufficiently on heating to permit the released gas molecules to form bubbles which expand. The resulting scatter centers or vesicles make the vehicle opaque to transmission of light in the exposed areas and also reflect and scatter light so that they appear white.

The early vesicular materials employed gelatin as the vehicle. These suffer from the difficulty that the vesicular images obtained therein fade rapidly. Later work has revealed that this problem of fading was caused, in part, by the sensitivity of gelatin to moisture. In particular, it has been found that gelatin vehicles tend to absorb moisture which in turn destroys the image.

A significant advance in the vesicular photography art, which avoids the difficulties inherent in the use of gelatin, is described in the copending application of James and Parker, Serial No. 623,050, now U.S. Patent No. 3,032,-414, the subject matter of which is incorporated herein by reference. In that improvement, a film-forming vehicle is prepared from certain non-hygroscopic resin materials which are combined with a sensitizer in an organic solvent or solvent mixture for the components. A uniform mixture of the components is formed in the solvent and this can be applied to the backing to form the desired vehicle.

Non-hygroscopic resin materials which are described in said James, et al. application as satisfactory are the synthetic, water-insoluble, non-hygroscopic, non-water swelling highly linear thermoplastic resins selected from the group consisting of homopolymers of styrene, homopolymers of vinyl chloride, homopolymers of vinylidene chloride, copolymers of vinyl chloride with a different vinyl monomer and copolymers of vinylidene chloride with a vinyl monomer. According to James et al., the resinous vehicles must have a permeability constant for nitrogen within the range of $8.6 \times 10^{-16}$ to $8 \times 10^{-10}$ to avoid escape of the gas before development and nevertheless permit sufficient diffusion of the released gas to form vesicles during the development. The preparation of the vehicle must also avoid unduly high temperatures and other conditions which lead to the decomposition of the sensitizer.

The principal object of the present invention is to provide further improvements in scatter center photographic materials. More particularly, the invention comprises the provision of scatter center photographic materials comprising, in the unexposed state, a homogeneous, preferably transparent, non-foamed, water insoluble, hydrophobic, thermoplastic polyurethane film having uniformly dispersed therein a light sensitive or photolytic agent which is non-reactive to the polyurethane film and which upon exposure to light decomposes to form decomposition products which are also non-reactive to the film and upon warming volatilize to provide the desired light scattering discontinuities according to the pattern of exposure. This polyurethane film is characterized by a permeability within the range of $8.6 \times 10^{-16}$ to $8 \times 10^{-10}$, this constant being the number of cubic centimeters of nitrogen transmitted at 30° C. by an area of one square centimeter in one second when the pressure gradient is one centimeter of mercury per centimeter of transmission layer thickness. This film is further characterized by its superior resistance to scratching and improved thermal stability.

It will be apparent from the foregoing that the success of the invention is based on the discovery that the vinyl or vinylidene resin coating or vehicle used in the James et al. application can be effectively replaced by a thermoplastic polyurethane resin vehicle or coating as aforesaid. A typical polyurethane resin suitable for use herein is the reaction product of castor oil and toluene diisocyanate which is a cross-linked type of polyurethane. One such polyurethane resin is available as Estane 5740X2. Any other film-forming polyurethane resins which are thermoplastic and water-insoluble and possess the other characteristics noted above may be effectively used herein. This includes the polyurethanes obtained by reaction of hydroxy-rich branched polyesters, i.e. polyhydroxy polyesters, and polyisocyanates. Typical polyesters are the reaction products of oxalic acid or adipic acid and trimethylol propane; or the reaction products of phthalic acid, adipic acid and trimethylol propane. Polyethers and/or polyester-amides may also be used in lieu of the polyesters.

The polyisocyanate component of the polyurethane may be a diisocyanate or triisocyanate. Usually, this component is toluene diisocyanate (2,4 and/or 2,6) but other polyisocyanates such as hexamethylene diisocyanate, naphthalene diisocyanate-1,5, methylene-bis-(4-phenyl isocyanate), and tri-(p-isocyanyl phenyl)methane and the like may also be used.

In preparing the photographic material of the invention, the polyurethane is preferably dissolved in a solvent or solvents therefor, e.g. methyl ethyl ketone or mixtures thereof with acetonitrile, and the light sensitive agent, i.e. diazo or the like, is likewise dissolved in another quantity of solvent or solvent mixture. These two solutions are then combined and coated onto any suitable supporting material such as "Mylar" film. After drying to remove the solvent, the resulting photographic film may be exposed to light and developed by dry heating briefly to produce a photograph which is stable at elevated temperatures and in the presence of substantial moisture. The film is further characterized, as noted above, with a permeability constant within the range indicated and such other advantages as improved thermal stability, scratch resistance, etc.

The light sensitive agent or sensitizer used herein should be non-reactive to the vehicle and should be decomposable upon exposure to light to form decomposition products which are also non-reactive to the polyurethane vehicle and upon warming volatilize to form the desired light scattering discontinuities. This agent should also be soluble in solvent or solvents used for preparing the film. Any of the light sensitive or photolytic agents mentioned in the James et al. application are suitable for use herein. This includes a wide variety of diazo compounds which liberate nitrogen on exposure to light such as para-diazo dimethyl aniline zinc chloride, p-diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1 - diazo - 2-oxynaphthalene-4-sulfonate, p-diethylaminobenzenediazonium chloride, $ZnCl_2$ 4-benzoylamino-2,5-diethoxybenzenediazonium chloride, the p-chlorobenzenesulfonate of 4-diazo-1-cyclohexylaniline, the p-chlorobenzene - sulfonate of 4-diazo-2-methoxy-1-cyclocyclohexylaminobenzene, the tin chloride double salt of 4-N-methylcyclohexylaminobenzenediazonium chloride, p-acetaminobenzenediazonium chloride, 4-dimethylaminobenzenediazonium chloride, 3-methyl-4-diethylaminobenzenediazonium chloride, 4-morpholinobenzenediazonium chloride, 4-piperidyl 2,5-diethoxybenzenediazonium chloride, 1-dimethylaminonaphthalene-4-diazonium chloride, and 4-phenylaminodiazobenzenediazonium chloride.

If desired, the polyurethane film of the present invention may be prepared and used in the unsupported form. Preferably, however, this film is supported on some suitable material. The support material may be transparent or opaque. Of the transparent supports, glass, ethyl cellulose, "Mylar" (oriented polyethylene terephthalate) and similar substances are satisfactory provided they withstand the operational temperatures required and are relatively free from plasticizers which tend to diffuse into the coating or film of vehicle and sensitizer. Cellulose acetate supports which, generally speaking, are undesirable because they contain diffusible plasticizers, can be used if a suitable barrier layer is interposed between the support and the polyurethane film or coating thereon.

Opaque supports are preferably flexible such as paper or synthetic sheet material. These supports can be of any color, but for certain purposes, black supports are particularly suitable. The vesicles or bubbles appear white on such black supports so that a positive image is produced directly. When transparent supports are used, the vesicular photographs can be used as negatives since the light-exposed areas are opaque to transmitted light only.

After exposure to light in a camera or other suitable device, the films of the invention are developed by heating to an elevated temperature, preferably in the range of 225–300° F. The time of heating will generally vary inversely with the temperature, but will usually be in the range of 1–10 seconds.

The following example illustrates the preparation of a scatter center record material according to the invention and its use.

*Example*

10 parts by weight of the diazo Edwal #8 (p-diazodimethylaniline zinc chloride) were dissolved in 80 parts acetonitrile which was then diluted with 20 parts of methyl ethyl ketone. This solution was then slowly added to a solution of polyurethane resin (Estane 5740X2 which is the reaction product of castor oil and toluene diisocyanate) comprising 100 parts of the resin and about 340 parts of methyl ethyl ketone warmed to about 125° F.

The resulting solution was then cast onto a Mylar film (about 0.5 mil thick) using a conventional doctor blade. The thus coated Mylar was then dried at about 200° F. to remove the solvents.

The thus dried product was then exposed to the light of a General Electric AH–6 lamp for a few seconds (e.g. 5–10 seconds) and thereafter developed by dry heat (e.g. confinement between two steel plates) at about 250° F. for approximately 3 seconds. A highly desirable image was obtained where the light of the AH–6 lamp had decomposed the diazo sensitizer. The film, both before and after exposure, had excellent scratch and abrasion resistance and was unaffected by substantial changes in temperature and moisture conditions.

It will be appreciated that various modifications may be made in the invention described herein without deviating from the scope thereof as set forth in the following claims.

I claim:
1. A record furnishing material capable of furnishing a record solely in the form of a distribution pattern of radiation scattering discontinuities formed within a vehicle which is optically substantially homogeneous, said material being in the form of a dry, water-resistant, non-hygroscopic film having a permeability constant for nitrogen within the range of $8.6 \times 10^{-16}$ and $8 \times 10^{-10}$, said constant being the number of cubic centimeters of nitrogen transmitted at 30° C., by an area of one square centimeter in one second when the pressure gradient is one centimeter of mercury per one centimeter of transmission thickness, the continuous phase of said film being essentially a preformed synthetic, homogeneous non-foamed water-insoluble hydrophobic, thermoplastic polyurethane resin and a light decomposable solid agent substantially uniformly dispersed in said film as the sole essential image producing agent, said decomposable agent itself being substantially non-reactive to said vehicle and upon exposure to light decomposing into products which are also chemically substantially non-reactive to said vehicle and which solely upon warming are volatile to form said radiation scattering discontinuities only in the light struck areas in said film having the indicated permeability to thereby furnish said record.

2. The scatter center photographic material of claim 1 including a supporting base.

3. The material of claim 2 wherein said base is transparent.

4. The material of claim 2 wherein said base is opaque.

5. The scatter center photographic material of claim 1 wherein said polyurethane resin is a cross-linked, thermoplastic, water-insoluble, hydrophobic essentially transparent polyurethane resin.

6. The material of claim 5 wherein said polyurethane is the reaction product of a polyhydroxy polyester and a polyisocyanate.

References Cited by the Examiner

UNITED STATES PATENTS

| | | | |
|---|---|---|---|
| 2,779,062 | 1/57 | Stasny | 260—2.5 |
| 2,926,147 | 2/60 | Rappaport et al. | |
| 2,948,706 | 8/60 | Schellenberg et al. | 96—115 |
| 3,032,414 | 5/62 | James et al. | 96—91 |

NORMAN G. TORCHIN, *Primary Examiner.*